(12) United States Patent
Briesewitz et al.

(10) Patent No.: US 11,891,032 B2
(45) Date of Patent: Feb. 6, 2024

(54) BRAKE-BY-WIRE BRAKING SYSTEM HAVING AT LEAST ONE BRAKE CIRCUIT, METHOD FOR OPERATING THE BRAKING SYSTEM AND DIAGNOSIS VALVE FOR A BRAKING SYSTEM OF THIS TYPE

(71) Applicant: Continental Teves AG & Co. oHG, Frankfurt am Main (DE)

(72) Inventors: Rüdiger Briesewitz, Frankfurt am Main (DE); Joseph Dolmaya, Frankfurt am Main (DE)

(73) Assignee: Continental Teves AG & Co. oHG

( * ) Notice: Subject to any disclaimer, the term of this patent is extended or adjusted under 35 U.S.C. 154(b) by 409 days.

(21) Appl. No.: 17/265,253

(22) PCT Filed: Jul. 22, 2019

(86) PCT No.: PCT/EP2019/069653
§ 371 (c)(1),
(2) Date: Feb. 2, 2021

(87) PCT Pub. No.: WO2020/025379
PCT Pub. Date: Feb. 6, 2020

(65) Prior Publication Data
US 2021/0300314 A1 Sep. 30, 2021

(30) Foreign Application Priority Data
Aug. 2, 2018 (DE) .................. 10 2018 212 905.3

(51) Int. Cl.
*B60T 17/22* (2006.01)
*B60T 8/32* (2006.01)
(Continued)

(52) U.S. Cl.
CPC ............ *B60T 17/221* (2013.01); *B60T 8/326* (2013.01); *B60T 8/341* (2013.01); *B60T 13/142* (2013.01);
(Continued)

(58) Field of Classification Search
CPC ...... B60T 17/221; B60T 13/142; B60T 8/326; B60T 8/341; B60T 13/62; B60T 2270/82;
(Continued)

(56) References Cited

U.S. PATENT DOCUMENTS 5,265,943 A 11/1993 Kehl et al.
5,474,371 A 12/1995 Shinomiya
(Continued)

FOREIGN PATENT DOCUMENTS

DE 9112163 U1 1/1993
DE 4342167 A1 6/1995
(Continued)

OTHER PUBLICATIONS

Chinese Office Action for Chinese Application No. 201980051070.0, dated Sep. 8, 2022 with translation, 12 pages.
(Continued)

*Primary Examiner* — Pamela Rodriguez
(74) *Attorney, Agent, or Firm* — RatnerPrestia

(57) ABSTRACT

To check the functionality/leak-tightness of a brake-by-wire brake system, a motor-operated brake pressure transducer is actuated. In this case, a pressure medium would flow out into a reservoir via a master brake cylinder. A diagnostic valve is therefore provided between the master brake cylinder and the reservoir, which diagnostic valve is composed of a check valve and a restrictor connected in parallel with respect to the check valve. The outflow of pressure medium is limited by the restrictor. Because the gradient of the pressure dissipation can be calculated, a measured pressure build-up (Continued)

can be compared with that which is to be expected, and a determination of functionality/leak-tightness can be derived from the comparison.

8 Claims, 2 Drawing Sheets

(51) Int. Cl.
    *B60T 8/34*     (2006.01)
    *B60T 13/14*     (2006.01)
    *B60T 15/02*     (2006.01)
    *F16K 17/00*     (2006.01)
    *B60T 13/62*     (2006.01)

(52) U.S. Cl.
    CPC ............ *B60T 15/028* (2013.01); *F16K 17/00* (2013.01); *B60T 13/62* (2013.01); *B60T 2270/402* (2013.01); *B60T 2270/404* (2013.01); *B60T 2270/406* (2013.01); *B60T 2270/82* (2013.01)

(58) Field of Classification Search
    CPC ............ B60T 2270/406; B60T 15/028; B60T 2270/402; B60T 2270/404; F16K 17/00
    See application file for complete search history.

(56) References Cited

U.S. PATENT DOCUMENTS

| | | |
|---|---|---|
| 9,845,085 B2 | 12/2017 | Besier et al. |
| 9,981,645 B2 | 5/2018 | Kim et al. |
| 10,059,321 B2 | 8/2018 | van Zanten et al. |
| 10,688,979 B2 | 6/2020 | Leiber et al. |
| 2003/0090149 A1 | 5/2003 | Kusano et al. |
| 2022/0219664 A1* | 7/2022 | Kim ..................... B60T 13/62 |

FOREIGN PATENT DOCUMENTS

| | | |
|---|---|---|
| DE | 102015208439 A1 | 11/2010 |
| DE | 102012219390 A1 | 4/2014 |
| DE | 102013216314 A1 | 2/2015 |
| DE | 202015008975 U1 | 6/2016 |
| DE | 102015106089 A1 | 10/2016 |
| DE | 102016220505 A1 | 4/2017 |
| DE | 102016211012 A1 | 12/2017 |
| EP | 0545338 A1 | 6/1993 |
| KR | 20160003780 A | 1/2016 |
| WO | 2012143175 A2 | 10/2012 |

OTHER PUBLICATIONS

German Search Report for German Application No. 10 2018 212 905.3, dated May 28, 2019 with partial translation, 10 pages.

International Search Report and Written Opinion for International Application No. PCT/EP2019/069653, dated Oct. 31, 2019, 13 pages.

International Search Report and Written Opinion for International Application No. PCT/EP2019/069653, dated Oct. 31, 2019, 18 Pages (German).

Korean Decision for Grant of Patent for Korean Application No. 10-2021-7002994, dated Dec. 20, 2022 with translation, 3 pages.

Korean Notice of Preliminary Rejection for Korean Application No. 10-2021-7002994, dated Jun. 21, 2022, with translation, 13 pages.

* cited by examiner

BRAKE-BY-WIRE BRAKING SYSTEM HAVING AT LEAST ONE BRAKE CIRCUIT, METHOD FOR OPERATING THE BRAKING SYSTEM AND DIAGNOSIS VALVE FOR A BRAKING SYSTEM OF THIS TYPE

CROSS REFERENCE TO RELATED APPLICATIONS

This application is the U.S. National Phase Application of PCT International Application No. PCT/EP2019/069653, filed Jul. 22, 2019, which claims priority to German Patent Application No. 10 2018 212 905.3, filed Aug. 2, 2018, the contents of such applications being incorporated by reference herein.

FIELD OF THE INVENTION

The invention relates to a brake-by-wire brake system which has at least one brake circuit, the brake-by-wire brake system having a pedal-actuated master brake cylinder, to which the brake circuit is hydraulically connected via a normally open isolation valve, having an electromotively actuatable brake pressure transducer to which the brake circuit is connected via a normally closed brake valve, and having a reservoir which is connected both to the master brake cylinder and via a suction valve to the brake pressure transducer.

BACKGROUND OF THE INVENTION

Such a brake system is known for example from DE 10 2013 216 314 A1, incorporated herein by reference. In the case of a pedal-imparted actuation of the master brake cylinder, the normally open isolation valve is closed and the normally closed valve of the brake pressure transducer is opened, wherein the pressure exerted by the driver on the master brake cylinder is measured. In accordance with the pressure selected by the driver in the master brake cylinder, the brake pressure transducer is actuated by motor, and a brake pressure is consequently built up in the wheel brakes connected to the brake circuit. Said brake pressure can be controlled in closed-loop fashion individually for each wheel by means of inlet and outlet valves. To lower the pressure in a wheel brake, the respective inlet valve is closed and the associated outlet valve is opened, such that pressure medium flows out of the wheel brake into the reservoir. For the renewed build-up of pressure, the inlet valve is opened again and pressure medium is conducted from the brake pressure transducer into the respective wheel brake via the opened brake valve.

A refilling process is provided in order that the pressure medium reserve in the brake pressure transducer is not exhausted. For this purpose, the brake valve is closed and the volume of the brake pressure transducer is increased, wherein pressure medium is drawn in from the reservoir via the check valve.

Since the master brake cylinder is hydraulically connected to the brake circuit and the basic state of the isolation valve is normally open, the pedal-imparted pressure can be transmitted to the wheel brakes in the conventional manner even in the event of failure of the electrical supply to the brake system.

In order to check the leak-tightness of the brake system, diagnostic steps are provided which include the brake pressure transducer being actuated, wherein it is registered whether a pressure is built up and maintained therein and, if applicable, in the connected brake circuit.

In order to carry out a comprehensive leak-tightness check, however, it is necessary to interrupt the connection between the reservoir and the master brake cylinder. Similar brake systems have hitherto provided for a so-called electromagnetically actuated diagnostic valve to be used in this connection. This additional valve however takes up structural space and has to be separately electrically actuated.

SUMMARY OF THE INVENTION

An aspect of the invention is based on creating a brake system, in which a leak-tightness check can be carried out with little additional outlay on valves.

An aspect of the invention provides that, in the connection between the reservoir and the master brake cylinder, there is incorporated a diagnostic valve which is composed of a check valve, which blocks in the direction of the reservoir, and of a restrictor connected in parallel with respect to said check valve.

Such a valve makes it possible that, after a braking operation, that is to say when the brake pedal is released again, a follow-up flow of pressure medium from the reservoir into the master brake cylinder is possible via the check valve that opens to a sufficient degree.

A diagnosis is however also possible. Specifically, if the brake pressure transducer is actuated in the diagnostic mode, pressure medium can duly flow out via the restrictor. The cross section thereof is however selected such that this takes place relatively slowly, such that it can be stated that the brake system is functional if the gradient of the brake pressure dissipation corresponds to the selected restrictor cross section.

In order to arrive at a reliable statement, a relatively narrow restrictor cross section must be selected, which is not suitable for a follow-up suction of pressure medium out of the reservoir. Therefore, the restrictor is connected in parallel with respect to the check valve, the opening cross section of which check valve is in any case larger than the opening cross section of the restrictor.

The advantage of such a diagnostic valve is that it operates purely hydraulically and does not require any electromagnetic actuation.

The diagnostic valve is preferably received in a connection bore for receiving a connector of the reservoir. The connection bore is situated in the wall of the master brake cylinder.

The check valve has—as is conventional—a valve closing body, which in this case is formed as a hollow body with a through-extending channel, wherein the narrowest cross section of the channel forms the restrictor and provides a throttling effect.

A braking travel simulator connected to the master brake cylinder is provided in order that, when the pedal is actuated, not only is a pressure built up in the master brake cylinder, which serves as control variable for the actuation of the brake pressure transducer, but also a pedal travel displacement occurs which corresponds to that of a conventional braking operation.

An aspect of the invention furthermore relates to a diagnostic method for checking the functionality of a brake system as claimed in claims 1-3, which is characterized in that, for the diagnosis, the brake valve is opened, the isolation valve is closed and the brake pressure transducer is actuated to build up an initial pressure, such that pressure medium flows out via the brake valve, the brake circuit, the isolation valve and the master brake cylinder into the reservoir in a throttled manner via the diagnostic valve.

Owing to the throttling effect, this is followed by a pressure dissipation of the initial pressure, which should have a gradient that can be determined on the basis of the restrictor cross section. If it does not deviate from the expected value, this can be interpreted as functionality/leak-tightness of the brake system.

An aspect of the invention also relates to a diagnostic valve which is composed of a check valve and of a restrictor. The valve is composed of a valve housing with a valve passage, which has a sealing seat and a valve closing body which can be placed sealingly against the sealing seat.

The valve closing body has a through-extending channel with a narrowed restrictor cross section, wherein the channel opens into the valve passage.

The valve housing preferably is composed of a sleeve with an intermediate base in which the valve passage is situated.

The valve closing body is preferably a cylindrical body which ends in a dome-shaped head, wherein the restrictor cross section is situated in the zenith of the dome.

A holding body for holding and guiding the valve closing body is situated in front of the side of the valve passage with the sealing seat. Said holding body is a rotationally symmetrical body which is placed against the walls of the sleeve and which has a cylindrical projection in which the valve closing body is guided.

The housing can be received in a cartridge which is inserted into the receiving bore.

A filter is situated in front of the valve passage which faces away from the sealing side.

BRIEF DESCRIPTION OF THE DRAWINGS

An aspect of the invention will be explained in more detail below on the basis of an exemplary embodiment. In the figures.

DETAILED DESCRIPTION OF THE PREFERRED EMBODIMENTS

Figure 1:
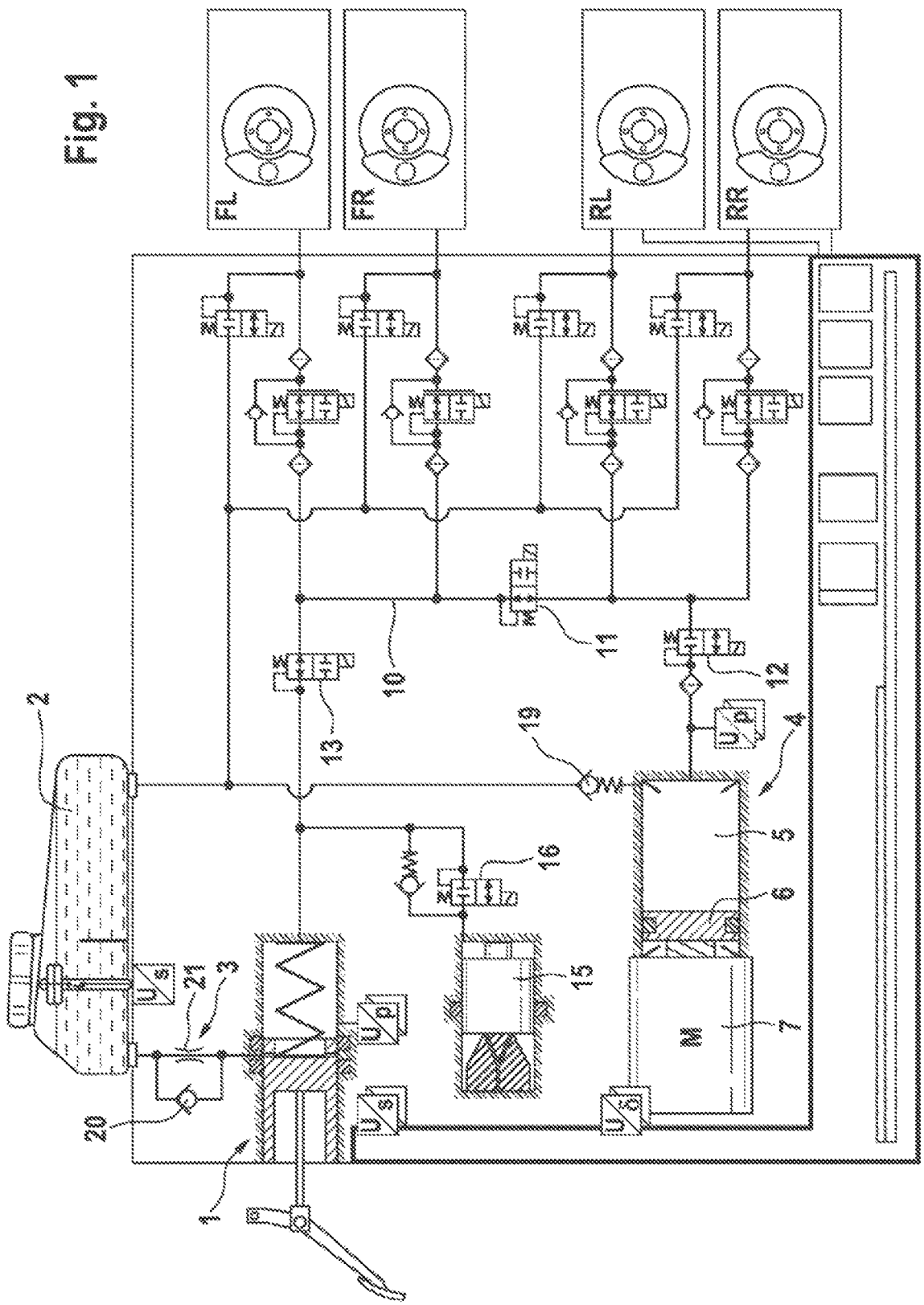
FIG. 1 shows a hydraulic circuit diagram for the brake system according to an aspect of the invention and FIG. 2 shows a cross section through an embodiment of a diagnostic valve.

The brake system is composed of a master brake cylinder 1, the piston of which can be actuated by a pedal. A reservoir 2 is connected to the master brake cylinder, wherein a diagnostic valve 3, the structure of which will be discussed in more detail further below, is situated in the connection between the reservoir 2 and the master brake cylinder 1.

The brake system also has an electromotively driven brake pressure transducer 4. This has an accumulator chamber 5, a piston 6 delimiting the accumulator chamber 5 and a drive motor 7 for driving the piston.

Both the master brake cylinder 1 and the brake pressure transducer 4 are connected to a quasi two-circuit brake circuit 10. This branches into four branch lines, each of which has a wheel brake connected thereto. Here, the branch lines for the front-wheel brake and for the rear-wheel brake are separated from one another by means of a separation valve 11.

The brake pressure transducer 4 is connected by means of a brake valve 12, and the master brake cylinder is connected by means of an isolation valve 13, to the brake circuit. The separation valve, the brake valve and the isolation valve 11, 12, 13 are each electromagnetically actuatable valves, wherein the separation valve 11 and the isolation valve 13 are normally open and the brake valve 12 is normally closed.

Inlet and outlet valves are situated in each case in or on the branch lines. The outlet valves are normally open and establish a connection between the respective wheel brake and the brake circuit 10, whereas the outlet valves are normally closed and establish a connection between the respective wheel brake and the reservoir 2.

Furthermore, a pedal travel simulator 15 is provided, which is connected via a simulator valve 16 to the master brake cylinder 1. The simulator valve 16 is likewise electromagnetically actuated and is closed in its electrically deenergized state.

When the pedal 2 is actuated, the brake valve 12 is opened, the isolation valve 13 is closed and the simulator valve 16 is opened. As a result, pressure medium is displaced from the master brake cylinder 1 into the braking travel simulator, and, in accordance with the spring installed in the pedal travel simulator 15, a counterpressure is generated against the pedal, which gives the driver a conventional brake pedal feel.

The pressure generated in the master brake cylinder 1 is measured and used as a control variable in order to control the actuations of the brake pressure transducer 4.

Closed-loop pressure control in the wheel brakes is performed by virtue of the inlet valves and outlet valves being opened and closed in a known manner. Here, the volume of the brake pressure transducer 4 can be exhausted. Therefore, during a brake actuation, phases are provided in which the volume of the accumulator chamber 5 of the brake pressure transducer 4 is increased such that pressure medium is conducted from the reservoir 2 into the accumulator chamber 5 via a suction valve 19.

What is crucial for an aspect of the invention is however the diagnostic valve 3, which is composed of a check valve 20, which blocks in the direction of the reservoir 2, and a restrictor 21 connected in parallel with respect to said check valve.

For the diagnosis of the brake pressure, the brake valve 12 is held closed. The brake pressure transducer 4 is then actuated, but since its accumulator chamber 5 is hydraulically closed, this leads to a pressure build-up. If the pressure remains constant, this means that there are no leaks.

In this way, however, only the brake pressure transducer 4 itself can be checked, but not the leak-tightness of the brake circuit 10 or of the master brake cylinder 1 connected thereto. For this, the brake valve 12 would have to be opened and the isolation valve 13 would have to remain open. In the event of an actuation of the brake pressure transducer, however, pressure medium would then flow out into the reservoir via the brake circuit and the non-actuated master brake cylinder. According to an aspect of the invention, this is prevented by the check valve 20, which imparts a blocking action, and to a certain extent by the restrictor 21.

However, the restrictor cross section determines the gradient of the pressure dissipation, such that it can be checked by means of a corresponding pressure measurement whether the gradient corresponds to that which is to be expected. If this is the case, this can be interpreted as leak-tightness of the system.

Figure 2:
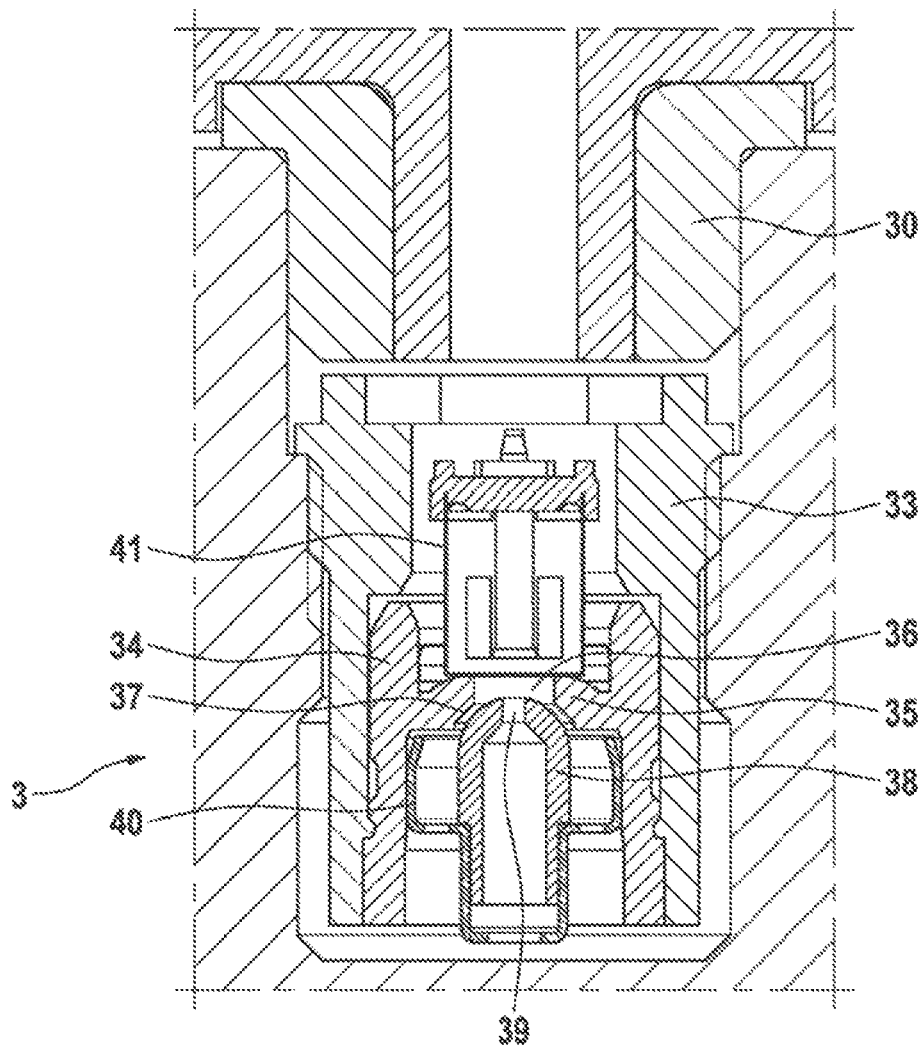

A diagnostic valve 3 which is suitable for this task is illustrated in cross section in FIG. 2. Said figure shows the wall of the master brake cylinder 1 with a receiving bore, the base of which is connected to a chamber of the master brake cylinder 1 and in the mouth of which there is situated a hollow plug 30 into which the connector of the reservoir 2 is inserted. Situated below the hollow plug 30 is a sleeve-shaped cartridge 33 in which a valve housing 34 is situated. Said valve housing is composed of a sleeve with an intermediate base 35 in which a valve passage 36 is situated.

The valve passage 36 has a sealing seat 37 on the side facing toward the base of the receiving bore. Situated in front of this sealing seat 37 is a valve closing body 38 in the form of a cylinder which transitions into a dome-shaped cap that can be placed against the sealing seat 37. A channel runs in the axis of the cylinder between the end sides of the cylinder.

In the cap there is situated a cross-sectional narrowing 39 of the channel, which forms the restrictor 21 of the diagnostic valve 3.

The valve closing body 38 is held and guided in a rotationally symmetrical hollow body 40 composed of sheet metal or plastic. Said hollow body has a region of relatively large cross section which is fitted into the sleeve of the valve housing 34 and held there by clamping action. The valve closing body 38 is guided in a section of relatively small diameter. On that side of the intermediate base 35 which faces away from the sealing seat 37, there is situated a filter body 41 with a filter covering the valve passage 36.

The valve housing 34 is inserted into the cartridge 33 and caulked or screwed there. The cartridge 33 with the valve can then be inserted into the connection bore of the master brake cylinder 1 and screwed, drilled, caulked or fastened in some other way there. Consideration may however also be given to omitting the cartridge 33 and inserting the valve housing 34 directly into the connection bore.

| List of reference designations | |
|---|---|
| 1 | Master brake cylinder |
| 2 | Reservoir |
| 3 | Diagnostic valve |
| 4 | Brake pressure transducer |
| 5 | Accumulator chamber |
| 6 | Piston |
| 7 | Drive motor |
| 10 | Brake circuit |
| 11 | Separation valve |
| 12 | Brake valve |
| 13 | Isolation valve |
| 15 | Pedal travel simulator |
| 16 | Simulator valve |
| 19 | Suction valve |
| 20 | Check valve |
| 21 | Restrictor |
| 30 | Hollow plug |
| 33 | Cartridge |
| 34 | Valve housing |
| 35 | Intermediate base |
| 36 | Valve passage |
| 37 | Sealing seat |
| 38 | Valve closing body |
| 39 | Cross-sectional narrowing |
| 40 | Hollow body |
| 41 | Filter body |

The invention claimed is:

1. A brake-by-wire brake system which has at least one brake circuit, the brake-by-wire brake system having a pedal-actuated master brake cylinder, to which the brake circuit is hydraulically connected via a normally open isolation valve, having an electromotively actuatable brake pressure transducer to which the brake circuit is connected via a normally closed brake valve, and having a reservoir which is connected both to the master brake cylinder and via a suction valve to the brake pressure transducer, wherein, in the connection between the reservoir and the master brake cylinder, there is incorporated a diagnostic valve which is composed of a check valve, which blocks in the direction of the reservoir, and of a restrictor connected in parallel with respect to said check valve, and wherein the diagnostic valve is accommodated in a connection bore, which is situated in the wall of the master brake cylinder, for receiving a connector of the reservoir.

2. The brake system as claimed in claim 1, wherein the check valve has a valve closing body which is formed as a hollow body with a through-extending channel, wherein the narrowest cross section of the channel forms the restrictor and provides a throttling effect.

3. A diagnostic method for checking the functionality of a brake system as claimed in claim 1, wherein, for the diagnosis, the brake valve is opened, the isolation valve is closed and the brake pressure transducer is actuated to build up an initial pressure, such that pressure medium flows out via the brake valve, the brake circuit, the isolation valve and the master brake cylinder into the reservoir in a throttled manner via the diagnostic valve.

4. The diagnostic method as claimed in claim 3, wherein a gradient of a pressure drop of the initial pressure is determined.

5. A diagnostic valve, which is composed of a check valve, a restrictor, and a filter body, wherein said diagnostic valve is composed of a valve housing with a valve passage, which has a sealing seat and a valve closing body which can be placed sealingly against the sealing seat, wherein the valve closing body has a through-extending channel with a narrowed restrictor cross section and the channel opens into the valve passage, and wherein the valve closing body includes an upper cylindrical portion facing the filter body and a dome-shaped portion provided on the upper cylindrical portion facing the filter body, wherein the restrictor cross section is situated in a zenith of the dome-shaped portion.

6. The diagnostic valve as claimed in claim 5, wherein a holding body for holding and guiding the valve closing body is situated in front of the side of the valve passage with the sealing seat.

7. The diagnostic valve as claimed in claim 6, wherein the holding body is a rotationally symmetrical hollow body which is placed against the walls of a sleeve and which has a cylindrical projection in which the valve closing body is guided.

8. The diagnostic valve as claimed in claim 5, wherein the valve housing is received in a cartridge which is inserted into a receiving bore.

* * * * *